(12) United States Patent
Zeller et al.

(10) Patent No.: US 11,900,034 B2
(45) Date of Patent: Feb. 13, 2024

(54) METHOD OF MODELING A COMPONENT FAULT TREE FOR AN ELECTRIC CIRCUIT

(71) Applicant: Siemens Aktiengesellschaft, Munich (DE)

(72) Inventors: Marc Zeller, Munich (DE); Jean-Pascal Schwinn, Munich (DE); Thomas Waschulzik, Freising (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/408,653

(22) Filed: Aug. 23, 2021

(65) Prior Publication Data

US 2022/0058320 A1 Feb. 24, 2022

(30) Foreign Application Priority Data

Aug. 24, 2020 (EP) .................................. 20192373

(51) Int. Cl.
*G06F 30/30* (2020.01)
*G06F 30/33* (2020.01)
(Continued)

(52) U.S. Cl.
CPC ............ *G06F 30/33* (2020.01); *G06F 30/327* (2020.01); *G06F 2117/02* (2020.01)

(58) Field of Classification Search
CPC .... G06F 30/33; G06F 30/327; G06F 2117/02; G06F 11/0751; G06F 11/079; G05B 23/0248; G05B 23/0278
See application file for complete search history.

(56) References Cited

U.S. PATENT DOCUMENTS 8,015,550 B2 * 9/2011 Berenbach .......... G06F 11/2257
717/124
2012/0330501 A1 * 12/2012 Sundaram .......... G05B 23/0248
701/33.9
(Continued)

FOREIGN PATENT DOCUMENTS

EP 3 260 940 12/2017 ............. G05B 23/02
EP 3 470 944 4/2019 ............. G05B 23/02

OTHER PUBLICATIONS

Search Report for EP Application No. 20192373.7, 10 pages, dated Feb. 17, 2021.
(Continued)

*Primary Examiner* — Jack Chiang
*Assistant Examiner* — Brandon Bowers
(74) *Attorney, Agent, or Firm* — Slayden Grubert Beard PLLC

(57) ABSTRACT

Various embodiments include modeling a component fault tree for a circuit with an input-side and an output-side component. These include using a fault tree corresponding to a hazard for each respective component, obtaining information about the components of the circuit and a connection between components, and connecting the respective fault trees based on the circuit description. Each fault tree includes an input fault mode or a basic event and an output fault mode. The output fault mode and the input fault mode are each assigned to a component terminal. An output fault mode of the input-side component tree is connected to an input fault mode of the output-side component tree if: there is a connection between the assigned terminal of the input-side component and the output-side component and the output fault mode of the input-side component correlates to an input fault mode of the output-side component.

14 Claims, 4 Drawing Sheets

(51) Int. Cl.
   *G06F 30/327*    (2020.01)
   *G06F 117/02*    (2020.01)

(56) References Cited

U.S. PATENT DOCUMENTS

| | | | | |
|---|---|---|---|---|
| 2017/0006047 | A1* | 1/2017 | Bharadwaj | H04L 63/1408 |
| 2017/0364063 | A1* | 12/2017 | Zeller | G05B 23/0248 |
| 2018/0018209 | A1* | 1/2018 | Höfig | G06F 11/0775 |
| 2019/0138416 | A1* | 5/2019 | Kaukewitsch | G05B 23/0218 |
| 2022/0058323 | A1* | 2/2022 | Heilmann | G05B 23/0248 |
| 2022/0292009 | A1* | 9/2022 | Zeller | G06F 11/3013 |

OTHER PUBLICATIONS

Kaiser, B., Liggesmeyer, P., Mäckel, O.: A new component concept for FTs. In: Proceedings of the 8th Australian Workshop on Safety Critical Systems and Software—vol. 33. pp. 37-46. SCS '03, 2003.

* cited by examiner

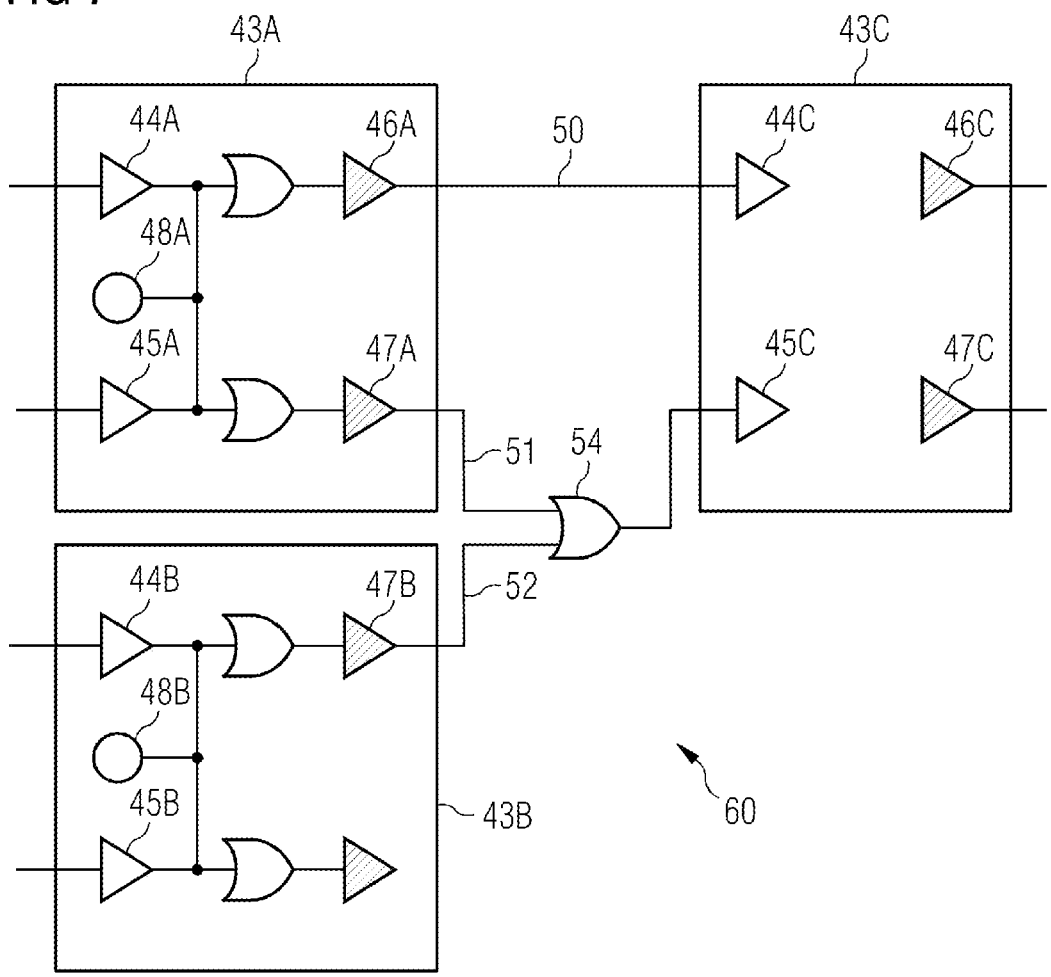
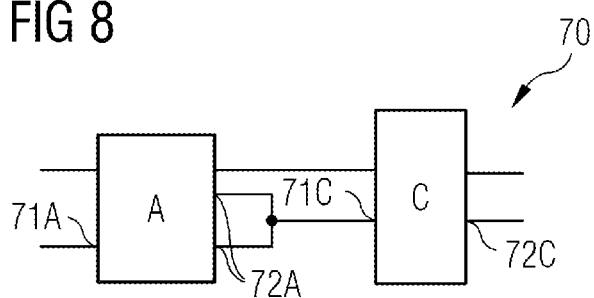

METHOD OF MODELING A COMPONENT FAULT TREE FOR AN ELECTRIC CIRCUIT

CROSS-REFERENCE TO RELATED APPLICATIONS

This application claims priority to EP Application No. 20192373.7 filed Aug. 24, 2020, the contents of which are hereby incorporated by reference in their entirety.

TECHNICAL FIELD

The present disclosure relates to electric circuits. Various embodiments of the teachings herein include methods, arrangements, computer program products, and/or computer-readable storage media for modeling a component fault tree for an electric circuit.

BACKGROUND

In technical systems, it is often necessary to check the safety and reliability thereof during the development thereof. As the complexity of safety-critical systems increases, safety and reliability analyses become more difficult and more complex; at the same time, they are in most cases a prerequisite for the approval and certification of the systems. Safety and reliability analyses are relevant, for example, in safety-critical systems in the automotive, aviation or rail transport fields. All hazards and the causes thereof should be identified and evaluated as far as possible here. In addition to qualitative statements about hazards, quantitative statements should also generally be possible in order to estimate whether the likelihood of a hazard or a fault occurring is sufficiently low and therefore acceptable. Safety standards are defined in many technical areas, for example ISO 26262 in the automotive field or CENELEC EN 50126 for rail transport systems.

A common means for safety and reliability analyses are fault trees, which constitute a top-down analysis proceeding from a fault or another undesired event. These can be used to make a qualitative or additionally a quantitative statement about the fault or the undesired event. They are stipulated in the standard IEC 61025. In addition to fault trees, hazard trees are also known and presented, for example, in the vehicle safety guidelines ("Sicherheitslinie Fahrzeuge (SIRF)") of the federal railway authority in Germany (Eisenbahn-Bundesamt). They are used, inter alia, to stipulate safety-related requirements and for risk assessment in the context of EN 50126 and describe a technical system in a similar manner to fault trees.

Component fault trees are also known. A component fault tree constitutes a Boolean model, which describes the fault propagation within a system component. The term "component fault tree" is explained in more detail, in particular in the publication "A new component concept for fault trees" (Kaiser, B., Liggesmeyer, P., & Mäckel, O. (2003), SCS '03: Proceedings of the 8th Australian workshop on Safety critical systems and software, =[1]). As described in [1], component fault trees can be modeled for the individual components of a technical system that are guided by the modular structure of the system and do not have to correspond to the module term within the context of the fault tree analysis. The significance of component fault trees is equivalent to that of classic fault trees. It is possible to make qualitative and also quantitative statements about the fault response of a component and also the entire technical system.

In contrast to classic fault trees, which are also described in more detail in [1], a component fault tree can have several top events (fault to be taken into consideration). A component fault tree can therefore deviate from the exact tree structure. Since a component fault tree fully describes a component, the structure of the fault presentation of a system with CFTs is easier than with classic fault trees.

Technical systems generally comprise software, mechanical parts and electric or electronic circuits. In this case, the proportion of the electric or electronic circuits increases. The significance of safety and reliability checks of the circuits in safety-critical systems accordingly becomes greater. Fault tree analyses are often carried out for this purpose. In this case, in the prior art, a component fault tree for a circuit is created manually by including information present in the circuit diagram of the circuit, information about failure rates of the components of the circuit that are used, and expert knowledge. This is very time-intensive and susceptible to faults, in particular as the complexity of the circuit increases. If the circuit changes over the course of the development process, a component fault tree analysis that is adapted thereto has to be carried out manually again.

SUMMARY

The present disclosure teaches methods and/or systems for creating a component fault tree for an electric or electronic circuit with a lower degree of outlay and higher degree of reliability. As an example, some embodiments of the teachings herein include a method for modeling a component fault tree for an electric circuit in which the electric circuit has at least one input-side (A, B) and at least one output-side component (C), in which a respective component fault tree (20A, 20B, 25C, 43A, 43B, 43C, 73A, 73C) is used for the components, which models a hazard for the component, and which has at least one input fault mode (21A, 21B, 26C, 44A, 44B, 44C, 45A, 45B, 45C, 74A, 74C, 75A, 75C) or a basic event (22A, 22B, 48A, 48B, 79) and at least one output fault mode (24A, 24B, 46A, 46C, 47A, 47B, 47C, 76A, 76C, 77A, 77C, 78A), wherein the output fault mode and the possibly present input fault mode are each assigned to a terminal (10A, 10B, 41A, 41B, 41C, 42A, 42B, 42C, 71A, 71C, 72A, 72C) of the component, in which a circuit description is used, which comprises information about the components (A, B, C) of the electric circuit and at least one connection of the components to one another, in which the component fault trees (20A, 20B, 25C, 43A, 43B, 43C, 73A, 73C) of the components (A, B, C) are connected based on the circuit description, wherein an output fault mode of the component fault tree of the input-side component (A) is connected to an input fault mode of the component fault tree of the output-side component (C) if a. the circuit description contains a connection between the assigned terminal of the input-side component (A, B) and the assigned terminal of the output-side component (C) and b. if the output fault mode (24A, 24B, 46A, 47A, 47B, 76A, 77A, 78A) of the component fault tree of the input-side component (A, B) correlates to an input fault mode (26C, 44C, 45C, 74C, 75C) of the component fault tree of the output-side component (C).

In some embodiments, a hazard tree for the electric circuit and/or for a technical system comprising the circuit is present, said hazard tree modeling a hazard for the electric circuit.

In some embodiments, the component fault tree for the circuit (30, 49, 60, 80) is modified, wherein an OR link of output fault modes of the component fault tree of the input-side component (A) or several component fault trees of input-side components (A, B), which are connected to the same input fault mode of the component fault tree of the output-side component (C), is changed to an AND link (32, 54, 84) if the hazard tree for the circuit and/or for a technical system comprising the circuit contains a corresponding piece of information about the link as an AND link or the circuit description contains a corresponding piece of information about the link as an AND link.

In some embodiments, the component fault tree for the circuit is modified, wherein an AND link of output fault modes of the component fault tree of the input-side component (A) or several component fault trees of input-side components (A, B), which are connected to the same input fault mode of the component fault tree of the output-side component (C), is changed to an OR link (53) if the hazard tree for the circuit and/or for a technical system comprising the circuit contains a corresponding piece of information about the link as an OR link or the circuit description contains a corresponding piece of information about the link as an OR link.

In some embodiments, the output fault mode of the component fault tree of the input-side component (A, B) correlates to an input fault mode of the component fault tree of the output-side component (C) if the fault modes have essentially the same name.

In some embodiments, the output fault mode of the component fault tree of the input-side component (A) correlates to an input fault mode of the component fault tree of the output-side component (C) if terms assigned to the fault modes are essentially the same.

In some embodiments, output fault modes of several component fault trees of input-side components (A, B) are connected to an input fault mode of the component fault tree of the output-side component.

In some embodiments, output fault modes of several component fault trees of input-side components (A, B) are connected to several input fault modes of component fault trees of several output-side components (C).

In some embodiments, the circuit description comprises a circuit diagram (40, 70) and an identification of the components (A, B, C) and the terminals (10A, 10B, 41A, 41B, 41C, 42A, 42B, 42C, 71A, 71C, 72A, 72C) thereof.

In some embodiments, the circuit description comprises an assignment of a hazard to a terminal (10A, 10B, 41A, 41B, 41C, 42A, 42B, 42C, 71A, 71C, 72A, 72C) of a component (A, B, C).

In some embodiments, the circuit description comprises a piece of information about redundant components and/or redundant connections and/or about AND links of components or connections.

In some embodiments, the circuit has at least two identical components and the same component fault tree (20A, 20B) is used for each of these.

In some embodiments, the circuit description comprises a piece of information about the fault rate of a component.

In some embodiments, the component fault tree of the circuit comprises a quantitative statement about the fault rate.

In some embodiments, the generated component fault tree is checked in order to find and/or identify a possible fault in the circuit description.

As another example, some embodiments include a device for modeling a fault tree of an electric circuit, comprising means for executing the method as described herein.

As another example, some embodiments include a computer program product, comprising instructions, which, when the program is executed by a computer, cause the computer to carry out a method as described herein.

As another example, some embodiments include a computer-readable data carrier, on which the computer program product as described herein is stored.

BRIEF DESCRIPTION OF THE DRAWINGS

The teachings of the present disclosure are described in greater detail below on the basis of exemplary embodiments with the aid of the figures, wherein only the features necessary for understanding the invention are illustrated. In the figures:

FIG. 1: shows a hazard tree
FIG. 2: shows a circuit diagram as part of a circuit description
FIG. 3: shows component fault trees of the components
FIG. 4: shows the component fault tree of the circuit
FIG. 5: shows a circuit diagram
FIG. 6: shows the component fault tree of the circuit
FIG. 7-9 show a third exemplary embodiment
FIG. 7: shows a circuit diagram
FIG. 8-9: show the component fault tree of the circuit

DETAILED DESCRIPTION

Figure 1:
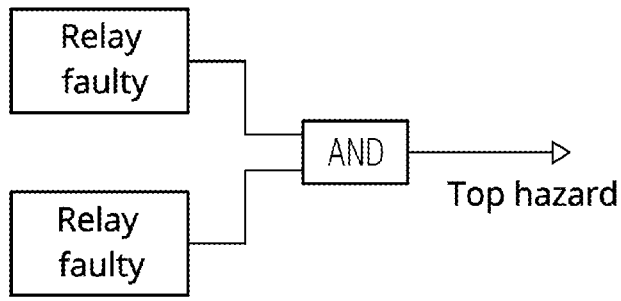
FIG. 1-4 show a first exemplary embodiment

The teachings of the present disclosure include automatic creation of a component fault tree for a circuit by including information contained in a circuit description of the circuit. For the circuit or the technical system comprising the circuit, there is at least one hazard tree, which models a hazard for the circuit. The hazard tree links events that cause the hazard to one another, for example by means of AND or OR.

In addition to the circuit diagram that can be illustrated graphically (that is to say a graphic illustration of the component parts of the circuit and the connections thereof), a circuit description comprises further information about the circuit, for example a list of the component parts of the circuit together with their properties, a sort of database of the component parts. In this case, there is an unambiguous identification of each component, preferably in the form of an unambiguous identification tag. The circuit description comprises a piece of information about the terminals/contacts of the component parts and connections of the component parts to one another and/or to the outside. In some embodiments, the circuit description also comprises an assignment of the hazards to the components or component parts and to the individual terminals thereof if these have several terminals. The circuit description may also contain a fault rate for each component, such that a quantitative analysis by way of the component fault tree of the circuit is possible.

In some embodiments, the circuit comprises several components, which constitute hardware components (component parts). Within the meaning of this patent application, in addition to a hardware component part (such as a relay, capacitor, . . . ), the term component also includes, for example, a terminal or contact. On the other hand, a component can also comprise several component parts and constitute a multi-component part of the circuit. The components are connected to one another by electrical or other lines or signal lines via the contacts thereof.

A component fault tree is assigned to one component. In this case, a fault at an output of the component is modeled by an output fault mode of the component fault tree, which is assigned to the or a specific output of the component. In a corresponding manner, a fault at an input of the component is modeled by an input fault mode of the component fault tree, wherein an assignment between the input and the input fault mode is provided. An internal fault in the component is modeled by a basic event. The fault rate of the component, if it is known, can be used as the fault rate for the basic event. An output fault mode is connected to the assigned input fault mode and to the basic event, wherein the input fault mode and the basic event are linked by OR. The reason for this is that a fault at the input or an internal fault in the component can generally lead to a fault at the output.

The fault propagation in the component can thus be modeled with the aid of the input fault mode and/or basic event and using the output fault mode. Boolean gates such as AND or OR can also be used for this purpose. The required information for the creation of the component fault tree can be taken from the hazard tree or from the circuit description. If the component consists only of one terminal, for example an output contact, the input fault mode and the output fault mode coincide in the assigned component fault tree.

When the component fault tree is generated automatically for a component, the identification tag of the component is preferably used as the name of the component fault tree. A component fault tree for the circuit is produced by virtue of the component fault trees of the components being connected to one another.

In this case, an output fault mode of the component fault tree of the input-side component is connected to an input fault mode of the component fault tree of the output-side component if
  a. the circuit description contains a connection between the assigned contact/output of the input-side and the assigned contact/input of the output-side component and
  b. the output fault mode of the component fault tree of the input-side component correlates to the input fault mode of the component fault tree of the output-side component.

There is then a correlation between an output fault mode of the component fault tree of the input-side component and an input fault mode of the component fault tree of the output-side component, for example, if the fault modes have essentially the same name.

In some embodiments, there is a correlation between an output fault mode of the component fault tree of the input-side component and an input fault mode of the component fault tree of the output-side component if terms assigned to the fault modes are essentially the same.

In some embodiments, there is a correlation between an output fault mode of the component fault tree of the input-side component and an input fault mode of the component fault tree of the output-side component if, in accordance with a defined hierarchical fault type model, the output fault mode and the input fault mode have the same fault type or if the fault type of the input fault mode corresponds to a higher hierarchy level.

Known methods can be used for the automatic linking of an output fault mode of a component fault tree of an input-side component to a correlating input fault mode of a component fault tree of an output-side component. By linking the correlating fault modes, the fault propagation prescribed by the hazard tree is mapped accordingly. This is possible because the fault modes are assigned unambiguously to a contact (output or input) of the component (an input fault mode is unambiguously assigned to a specific input, an output fault mode is unambiguously assigned to a specific output) and the fault modes contain a piece of information about the respectively assigned hazard. As a result, the assignment of hazards to the contacts of the component is also known.

In some embodiments, the output fault mode and associated input fault mode have the same or at least similar designations. Linking can then take place, as is described in the publication "Automated Compositional Safety Analysis using Component Fault Trees" (Möhrle, F., Zeller, M., Höfig, K., Rothfelder, M., & Liggesmeyer, P.), 2015 IEEE International Symposium on Software Reliability Engineering Workshops (ISSREW), pp. 152-159, Washington, D.C., USA, =[2]), the full content of which is included here. Automatic linking then takes place in the case of identical names. The names can be standardized and, when the names are not identical, the distance thereof, that is to say the similarity thereof, can be determined. Criteria according to which the names of an output fault mode and an input fault mode are considered as essentially the same can be stipulated so that automatic mapping can take place.

The automatic linking of an output fault mode of a component fault tree of an input-side component to a correlating input fault mode of a component fault tree of an output-side component can further take place according to the procedure described in the publication "A Formal Approach for Automating Compositional Safety Analysis Using Flow Type Annotations in Component Fault Trees" (Möhrle, F., Bizik, K., Zeller, M., Höfig, K., Rothfelder, M., & Liggesmeyer, P. (2017), Proceedings of the 27th European Safety and Reliability Conference (ESREL): Safety and Reliability—Theory and Applications. Taylor and Francis (CRC Press)=[3]), the full content of which is included here. Here, a hierarchical system for fault types is defined and a respective fault type in the form of an annotation is assigned to the output fault modes and input fault modes. These annotations are machine-readable, such that correlating fault modes can be linked automatically.

A further example of the automatic linking is described in the U.S. Pat. No. 10,241,852 B2, the full content of which is included here. Here, a hierarchical fault type model is defined and a respective fault type is assigned to the fault modes. Linking takes place automatically if the output fault mode and the input fault mode have the same fault type or if the fault type of the input fault mode is more general (at a higher hierarchy level).

If the circuit comprises several identical components having the same component fault tree, an instance of the corresponding component fault tree is produced for each component. Output fault modes and input fault modes of the component fault trees (or the respective instances of the component fault trees) are then connected according to the information in the circuit description, that is to say the connections given in the circuit description are adopted for the linking of the fault modes.

In some embodiments, the component fault tree for the circuit thus created is modified again. If first output fault modes that are connected to the same input fault mode are linked by OR by the above-described connections of component fault trees, one or more links must if applicable be changed to an AND link, specifically if the hazard tree or the circuit description specifies a simultaneous presence of the fault modes as a prerequisite for fault propagation. By changing to an AND link, the hazards can be propagated to one or more input fault modes of the other components in an appropriate manner.

In some embodiments, the corresponding information about the AND link is taken from the hazard tree, and the OR link is changed to an AND link. As a result of the fact that first an OR link is generated, all fault causes are reliably detected individually and the risk of a non-detected fault cause is minimized.

In some embodiments, the corresponding information about the AND link is taken from the circuit description, and the OR link is changed to an AND link. The circuit description must thus comprise this information. In some embodiments, this information is also incorporated into the database of the component parts. A component part or a component can be specified as redundant for a specific other component part/component, such that the associated terminals and connections are also redundant. This is the case, in particular, if the circuit has an additional component that is redundant for one component and the fault is propagated only if the component and the redundant component fail.

In an analogous manner, a further step with modification is carried out if first only AND connections are produced, of which some have to be changed to an OR connection. However, it is also possible to take into account the information about an AND or an OR link as early as in the linking of the component fault trees for the components.

A quantitative statement about the safety and reliability of the circuit is possible if corresponding data are present. For example, the circuit description can contain MTTF (mean time to failure) values or other fault rates for the components. The fault tree can comprise quantitative statements about hazards or specific events that are adopted in the corresponding fault modes.

The methods described herein can resort to already existing component fault trees of components in the production of the component fault tree for the circuit and use same if these have already been generated previously and, for example, can be retrieved from a library. However, it is also possible to produce the component fault trees of the components when the method is carried out.

Manual outlay is prevented on account of the automatic creation of a component fault tree for a circuit. A qualitative and if applicable also quantitative fault tree analysis can be carried out using the component fault tree. When the circuit is changed, for example by exchanging a component part or changing the wiring, the component fault tree can be adapted easily and automatically; a manual change is not necessary. Only the changed circuit description has to be used, if applicable also a changed hazard tree.

It is also possible to compare the component fault tree for the circuit generated according to the invention with a manually generated one that is already present and thus to further increase the safety. It is possible to determine whether the manually created component fault tree is correct and complete. Furthermore, faults, for example inconsistencies or gaps, in the circuit diagram and/or in the circuit description can be found by way of the method. Component fault trees of components that are not connected to component fault trees of other components (that is to say are quasi "isolated") indicate that the information serving as a basis for the method is possibly incomplete or erroneous.

For example, information about wiring of the component, to which such an "isolated" component fault tree belongs, with another component, to or by which a fault is propagated, is missing from the circuit description. In other words, although the two mentioned component fault trees have correlating fault modes, they are not linked to one another on account of the connection between the components that is missing in the circuit diagram. As a further example, a piece of information about the faults or hazards and/or the assignment thereof to a component or a terminal may be missing or false, with the result that the link between correlating fault modes is not possible at this point. Finding such faults and the causes thereof can take place automatically.

FIG. 1 shows the hazard tree for an electric circuit with two relays as input-side components, wherein the second relay is redundant for the first relay. A hazard for the circuit is present if both relays fail, that is to say there is a fault at both outputs. In the hazard tree, the two events "relay faulty" are therefore linked by AND to the event "top hazard".

Figure 2:
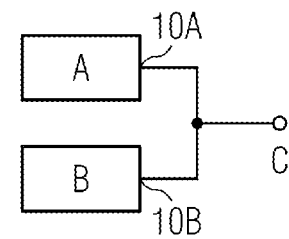

FIG. 2 shows the assigned circuit diagram with the two relays A, B and the outputs 10A and 10B, which are interconnected to form a common output C. The other terminals of the relays are not illustrated for the sake of clarity. The common output C constitutes the output-side component within the meaning of the patent. The circuit diagram is part of a circuit description, which comprises pieces of information regarding the components of the circuit and the terminals and connections thereof in the form of a database. For example, an identification number, the exact component part designation, the fault rate thereof, the safety relevance thereof, the contacts thereof with assigned connections and other things are stored for each component.

Figure 3:
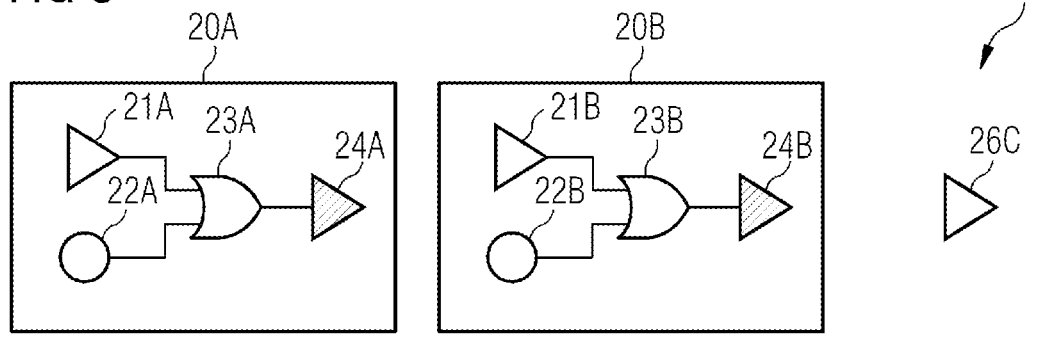

FIG. 3 shows the component fault tree 20A, 20B of the relays. Since both relays A, B are identical component parts, the component fault tree is identical for both; two instances of the component fault tree are therefore illustrated in FIG. 3. The term "component fault tree" is also used for the instances thereof within the meaning of the patent. Said component fault tree has an input fault mode 21A, 21B, which maps a faulty actuation of the relay, for example, and also a basic event 22A, 22B, which maps an internal fault of the relay. They are linked by OR 23A, 23B to an output fault mode 24A, 24B. The output fault mode has a name, for example "relay fault". In the component fault tree 25C for the component "common output", the input fault mode and the output fault mode coincide; they are denoted by "relay fault". For the sake of simplicity, it is illustrated only as input fault mode 26C.

Figure 4:
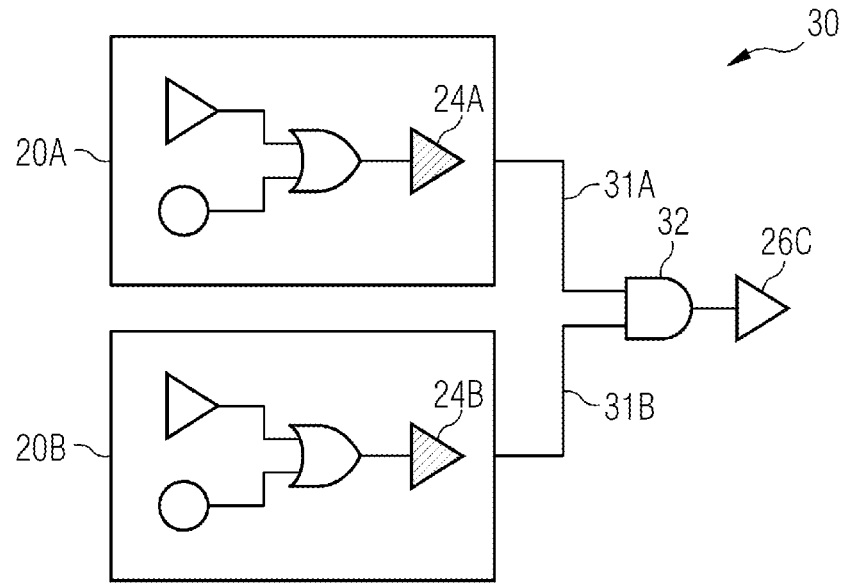

FIG. 4 shows the generated component fault tree 30 of the circuit. Since the circuit diagram connects the input-side component A to the output C and the input-side component B to the output C and the names of the fault modes are the same, namely "relay fault", a link 31A is produced automatically between the output fault mode 24A of the input-side component fault tree 20A and the input fault mode 26C of the output-side component fault tree 25C. A link 31B is likewise produced automatically between the output fault mode 24B of the input-side component fault tree 20B and the input fault mode 26C of the output-side component fault tree 25C.

The two links 31A, 31B are automatically linked by OR to the input fault mode 26C of the output. The information that the two events "relay faulty" are linked by AND and then the hazard "top hazard" occurs is stored in the hazard tree of the circuit or of the technical system having the circuit and/or in the circuit description. This information can be assigned to the components and/or the connections in the hazard tree. The information about the AND link is read out automatically and the OR link produced in the component fault tree is changed to an AND connection 32. Taking into account the information that an AND connection has to be produced can also be done as early as at the creation of the links so that subsequent modification is not necessary.

Figure 5:
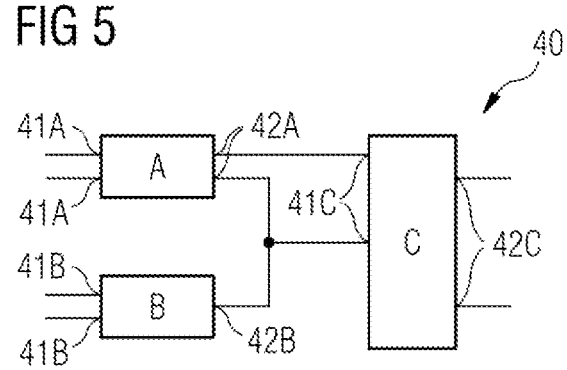
FIG. 5-6 show a second exemplary embodiment

FIG. 5 shows as a further exemplary embodiment a circuit diagram with two input-side components A, B and one output-side component C. Like in the first exemplary embodiment, a respective output of the input-side components is connected to the output-side component C. The components have several input contacts 41A, 41B, 41C and several output contacts 42A, 42B, 42C. The components can have several input faults and several output faults as well as possibly internal faults. With the aid of the hazard tree (not illustrated), a component fault tree is generated for each component, or has already been generated and is available in a library.

Figure 6:
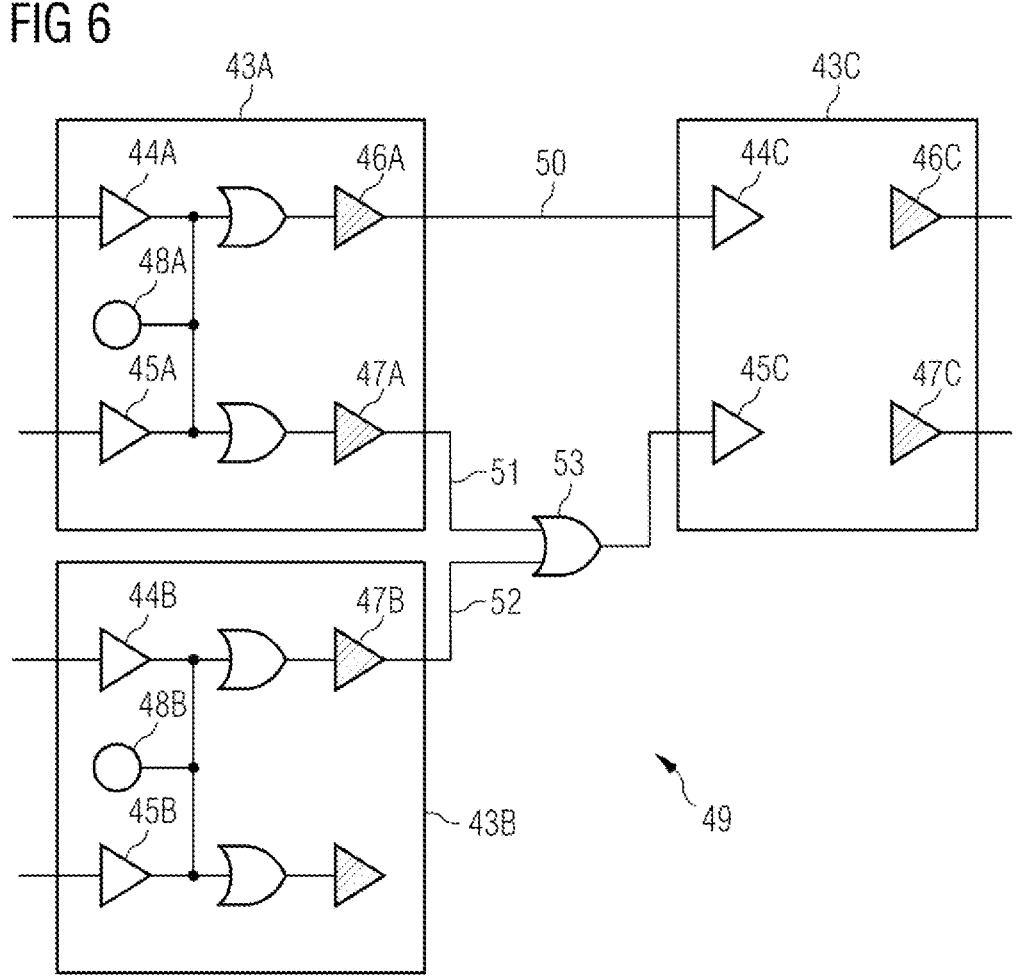

FIG. 6 shows the component fault trees 43A, 43B, 43C, created based on the hazard tree, for the components A, B, C. They have input fault modes 44A, 45A, 44B, 45B, 44C, 45C and output fault modes 46A, 47A, 47B, 46C, 47C, which are each assigned to an input contact or output contact of the corresponding component A, B, C. In principle, it is also possible for several input fault modes to be assigned to the same input contact; the same applies to output fault modes and output contacts. Internal faults are taken into account by basic events 48A, 48B. For reasons of clarity, the internal structure is not illustrated in the component fault tree 43C of the output-side component C. The fault modes are provided with designations, for example output fault mode 46A with "fault1", output fault modes 47A and 47B with "fault2", input fault mode 44C with "fault_1" and input fault mode 45C with "fault_2".

The component fault tree 49 for the circuit is now created automatically by virtue of an output fault mode of an input-side component fault tree being linked to an input fault mode of the output-side component fault tree if the assigned contacts in the circuit diagram or the circuit description are connected to one another and the fault modes correlate. A correlation can be determined based on similar, that is to say substantially identical, designations. The designations "fault1" and "fault_1" are substantially the same, which can be identified by a method described in the prior art. The same applies to the designations "fault2" and "fault_2". In this way, the links 50, 51, 52 are created automatically, wherein the output fault modes "fault2" are connected in an OR link 53 to the correlating input fault mode "fault_2".

FIG. 7 shows an exemplary embodiment with the following change with respect to FIG. 6: If the hazard tree for the circuit or for the technical system comprising the circuit or the circuit description contains the information that the fault propagates to the output-side component fault tree 43C or to the component C only upon the simultaneous occurrence of "fault2" as output fault mode of the input-side component fault trees or at the output contacts 42A and 42B of the components A and B, the links 51 and 52 must be linked in an AND link to the input fault mode 45C. In this case, the information about the AND link is taken from the hazard tree or the circuit description and the component fault tree 60 for the circuit 40 is produced using the corresponding AND link.

The circuit component fault trees in accordance with FIGS. 6 and 7 relate to circuit diagrams with identical connections between the components A, B and C, illustrated in FIG. 5. However, the hazard trees are different, which results in differences in the circuit descriptions and different logic links, namely in the one case OR 53 and in the other case AND 54. Furthermore, the components A, B and C are generally not identical in both cases.

FIG. 8 shows a circuit diagram 70 with an input-side component A and an output-side component C, wherein two contacts 72A of the input-side component A are connected to a contact 71C of the output-side component C. The components can have several input faults and several output faults. A component fault tree is generated for each component, or has already been generated and is available in a library.

Figure 9:
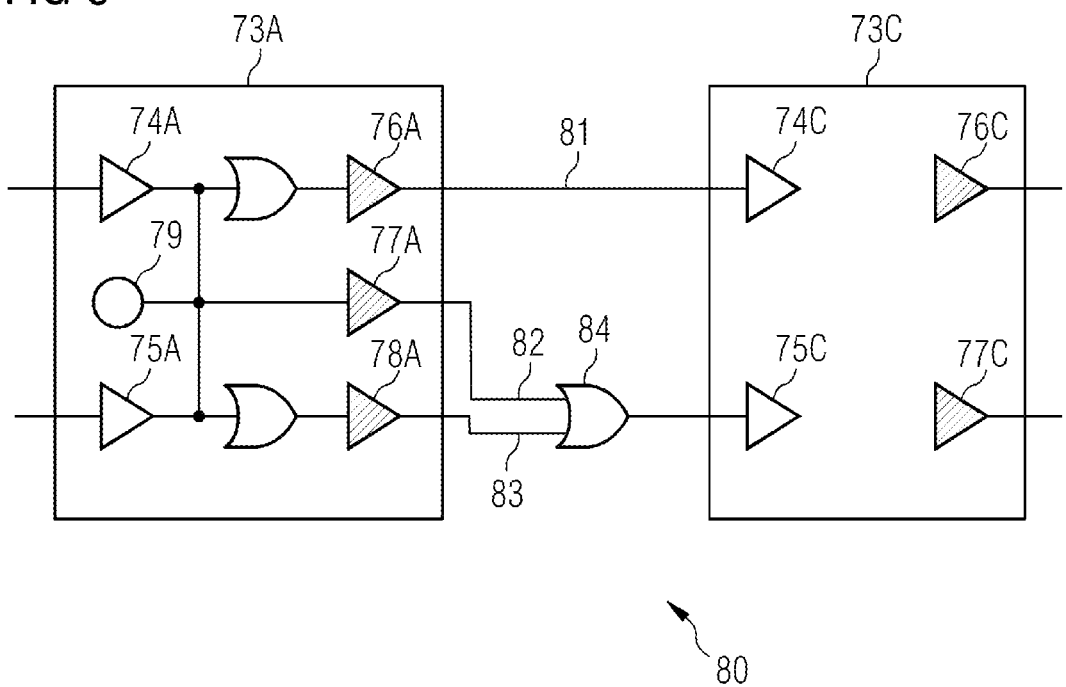

FIG. 9 shows the component fault trees 73A, 73C for the components A, C created based on the hazard tree. These component fault trees have input fault modes 74A, 75A, 74C, 75C and output fault modes 76A, 77A, 78A, 76C, 77C, which are assigned to input contacts and output contacts, respectively, of the corresponding component A, C. As in the previous example, the fault modes are provided with designations and the component fault tree 80 for the circuit 70 is created by automatically connecting an output fault mode to a correlating input fault mode of the output-side component fault tree. In this example, stored in the circuit description is a piece of information that the output fault modes 77A and 78A propagate using an AND link to the input fault mode 75C of the output-side component; this information is accordingly read out and the connections 82 and 83 are guided to the input fault mode 75C in an AND link.

The invention claimed is:

1. A method for modeling a component fault tree for an electric circuit with an input-side component and an output-side component, the method comprising:
obtaining a respective component fault tree for each respective component, each respective component fault tree corresponding to a hazard for the respective component, wherein each fault tree includes an input fault mode or a basic event and an output fault mode, wherein the output fault mode and the input fault mode are each assigned to a terminal of the component;
obtaining a circuit description including information about the various components of the electric circuit and a connection between components, wherein the circuit description includes a list of additional components of the circuit with respective terminals and/or contacts, the additional components disposed in the circuit between the input-side component and the output-side component;
connecting the respective component fault trees of the input-side component, the output-side component, and the additional components based on the circuit description; and
obtaining a hazard tree for the electric circuit and/or for a technical system comprising the circuit, the hazard tree modeling a hazard for the electric circuit;
wherein an output fault mode of the component fault tree of the input-side component is connected to an input fault mode of the component fault tree of the output-side component if:
the circuit description contains a connection between the assigned terminal of the input-side component and the assigned terminal of the output-side component; and
the output fault mode of the component fault tree of the input-side component correlates to an input fault mode of the component fault tree of the output-side component; and
wherein an OR link of output fault modes of the component fault tree of the input-side component or several component fault trees of input-side components connected to the same input fault mode of the component fault tree of the output-side component is changed to an AND link if:
the hazard tree for the circuit and/or for a technical system comprising the circuit contains a corresponding piece of information about the link as an AND link; or the circuit description contains a corresponding piece of information about the link as an AND link.

2. The method as claimed in claim 1, further comprising modifying the component fault tree for the circuit;
wherein an AND link of output fault modes of the component fault tree of the input-side component or several component fault trees of input-side components connected to the same input fault mode of the component fault tree of the output-side component is changed to an OR link if:
the hazard tree for the circuit and/or for a technical system comprising the circuit contains a corresponding piece of information about the link as an OR link or
the circuit description contains a corresponding piece of information about the link as an OR link.

3. The method as claimed in claim 1, wherein the output fault mode of the component fault tree of the input-side component correlates to an input fault mode of the component fault tree of the output-side component if the fault modes have essentially the same name.

4. The method as claimed in claim 1, wherein the output fault mode of the component fault tree of the input-side component correlates to an input fault mode of the component fault tree of the output-side component if terms assigned to the fault modes are essentially the same.

5. The method as claimed in claim 1, further comprising connecting output fault modes of several component fault trees of input-side components to an input fault mode of the component fault tree of the output-side component.

6. The method as claimed in claim 1, further comprising connecting output fault modes of several component fault trees of input-side components to several input fault modes of component fault trees of several output-side components.

7. The method as claimed in claim 1, wherein the circuit description comprises a circuit diagram and an identification of the components and the terminals thereof.

8. The method as claimed in claim 1, wherein the circuit description comprises an assignment of a hazard to a terminal of a component.

9. The method as claimed in claim 1, wherein the circuit description comprises a piece of information about redundant components and/or redundant connections and/or about AND links of components or connections.

10. The method as claimed in claim 1, wherein the circuit has at least two identical components and the same component fault tree is used for each of these.

11. The method as claimed in claim 1, wherein the circuit description comprises a piece of information about the fault rate of a component.

12. The method as claimed in claim 1, wherein the component fault tree of the circuit comprises a quantitative statement about the fault rate.

13. The method as claimed in claim 1, further comprising checking the generated component fault tree to find and/or identify a possible fault in the circuit description.

14. A method for modeling a component fault tree for an electric circuit with an input-side component and an output-side component, the method comprising:
obtaining a respective component fault tree for each respective component, each respective component fault tree corresponding to a hazard for the respective component, wherein each fault tree includes an input fault mode or a basic event and an output fault mode, wherein the output fault mode and the input fault mode are each assigned to a terminal of the component;
obtaining a circuit description including information about the various components of the electric circuit and a connection between components, wherein the circuit description includes a list of additional components of the circuit with respective terminals and/or contacts, the additional components disposed in the circuit between the input-side component and the output-side component;
connecting the respective component fault trees of the input-side component, the output-side component, and the additional components based on the circuit description; and
obtaining a hazard tree for the electric circuit and/or for a technical system comprising the circuit, the hazard tree modeling a hazard for the electric circuit;
wherein an output fault mode of the component fault tree of the input-side component is connected to an input fault mode of the component fault tree of the output-side component if:
the circuit description contains a connection between the assigned terminal of the input-side component and the assigned terminal of the output-side component; and
the output fault mode of the component fault tree of the input-side component correlates to an input fault mode of the component fault tree of the output-side component; and
wherein an AND link of output fault modes of the component fault tree of the input-side component or several component fault trees of input-side components connected to the same input fault mode of the component fault tree of the output-side component is changed to an OR link if:
the hazard tree for the circuit and/or for a technical system comprising the circuit contains a corresponding piece of information about the link as an OR link or
the circuit description contains a corresponding piece of information about the link as an OR link.

* * * * *